US008925686B2

(12) United States Patent
Saint-Jalmes et al.

(10) Patent No.: US 8,925,686 B2
(45) Date of Patent: Jan. 6, 2015

(54) COLLAPSIBLE STAIRCASE, NOTABLY FOR A VEHICLE SUCH AS AN AIRCRAFT

(75) Inventors: Bruno Saint-Jalmes, Toulouse (FR); Jason Zaneboni, Blagnac (FR); Bernard Rumeau, Cornebarrieu (FR)

(73) Assignee: Airbus, Blagnac (FR)

( * ) Notice: Subject to any disclaimer, the term of this patent is extended or adjusted under 35 U.S.C. 154(b) by 1219 days.

(21) Appl. No.: 11/964,422

(22) Filed: Dec. 26, 2007

(65) Prior Publication Data
US 2008/0156933 A1 Jul. 3, 2008

(30) Foreign Application Priority Data

Dec. 26, 2006 (FR) ...................................... 06 11357
Mar. 16, 2007 (FR) ...................................... 07 01941

(51) Int. Cl.
*B64C 1/24* (2006.01)
*E06C 1/02* (2006.01)
*B64D 11/00* (2006.01)
*B60R 3/02* (2006.01)

(52) U.S. Cl.
CPC . *B60R 3/02* (2013.01); *B64D 11/00* (2013.01); *B64D 2011/0076* (2013.01); *B64C 1/24* (2013.01)
USPC ...................... 182/156; 244/129.6; 244/137.2; 182/93; 182/194

(58) Field of Classification Search
USPC .......... 182/33.5, 91, 94, 127, 161, 1, 194, 95, 182/156, 93, 106, 82; 244/129.6, 137.2, 244/118.5, 137.1; 52/182
See application file for complete search history.

(56) References Cited

U.S. PATENT DOCUMENTS

| 299,833 | A | * | 6/1884 | Mott, Jr. ........................... 182/94 |
| 1,215,827 | A | * | 2/1917 | Lord ................................. 182/1 |
| 2,743,861 | A | | 5/1956 | Mattis et al. |
| 2,864,542 | A | * | 12/1958 | Marryatt ......................... 182/21 |
| 3,556,248 | A | | 1/1971 | Brown |
| 4,805,736 | A | * | 2/1989 | Byrnes, Jr. ...................... 182/95 |
| 5,397,143 | A | | 3/1995 | Bird |
| 6,003,813 | A | * | 12/1999 | Wentland et al. .......... 244/118.5 |
| 6,425,711 | B1 | * | 7/2002 | Kiter ............................. 405/218 |

(Continued)

FOREIGN PATENT DOCUMENTS

EP 1 293 425 A2 3/2003

OTHER PUBLICATIONS

Definiton of 'translation' can be found in the Final Action The American Heritage® Dictionary of the English Language, Fourth Edition copyright © 2000 by Houghton Mifflin Company. Updated in 2009. Published by Houghton Mifflin Company. All rights reserved.*

(Continued)

*Primary Examiner* — Daniel Cahn
(74) *Attorney, Agent, or Firm* — Oblon, Spivak, McClelland, Maier & Neustadt, L.L.P.

(57) ABSTRACT

A collapsible staircase is provided with a set of flat parts, with each of the parts intended to function as steps. Each flat part can be moved between a first position and a second position. All of the flat parts are substantially coplanar when the parts are in the first position, and the parts are disposed above each other and at a distance from each other when the parts are in the second position. A retractable holding handle is also provided and driven together with the flat parts.

17 Claims, 4 Drawing Sheets

(56) References Cited

U.S. PATENT DOCUMENTS

| | | | |
|---|---|---|---|
| 6,581,876 B2 * | 6/2003 | Cheung | 244/118.5 |
| 6,659,224 B2 * | 12/2003 | Medsker | 182/91 |
| 7,159,261 B2 * | 1/2007 | Carrigan | 14/71.1 |
| 7,383,600 B2 * | 6/2008 | Carrigan | 14/71.1 |

OTHER PUBLICATIONS

Definiton of 'wheel' can be found in the Final Action Collins English Dictionary—Complete and Unabridged © HarperCollins Publishers 1991, 1994, 1998, 2000, 2003.*

* cited by examiner

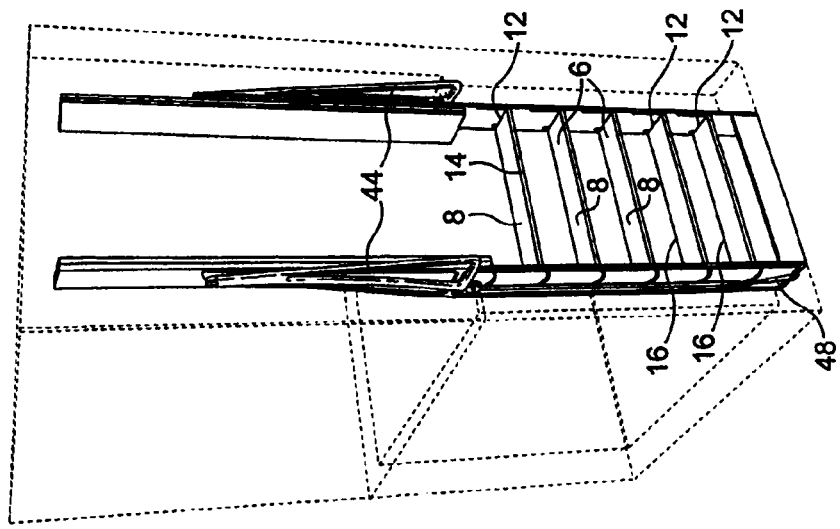
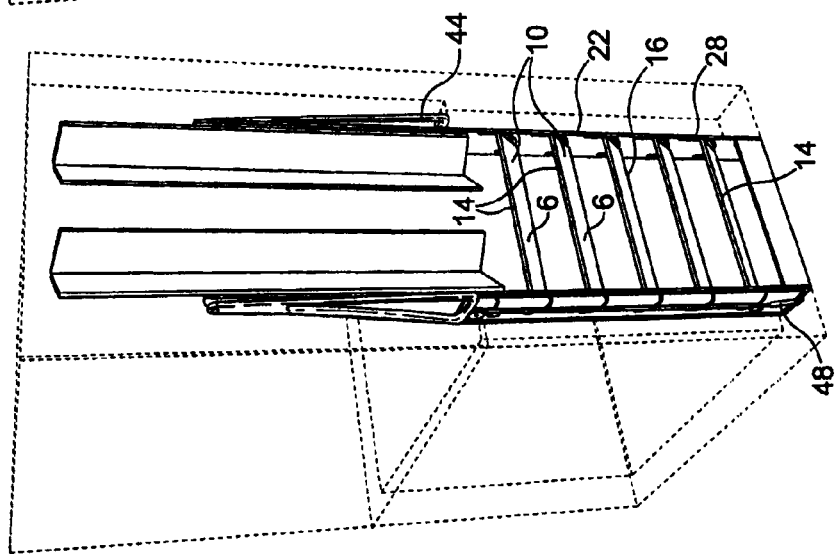
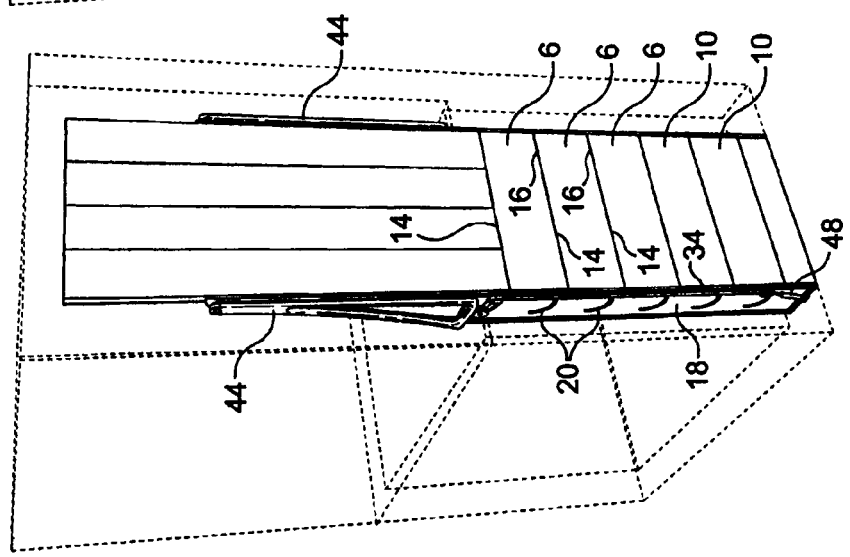

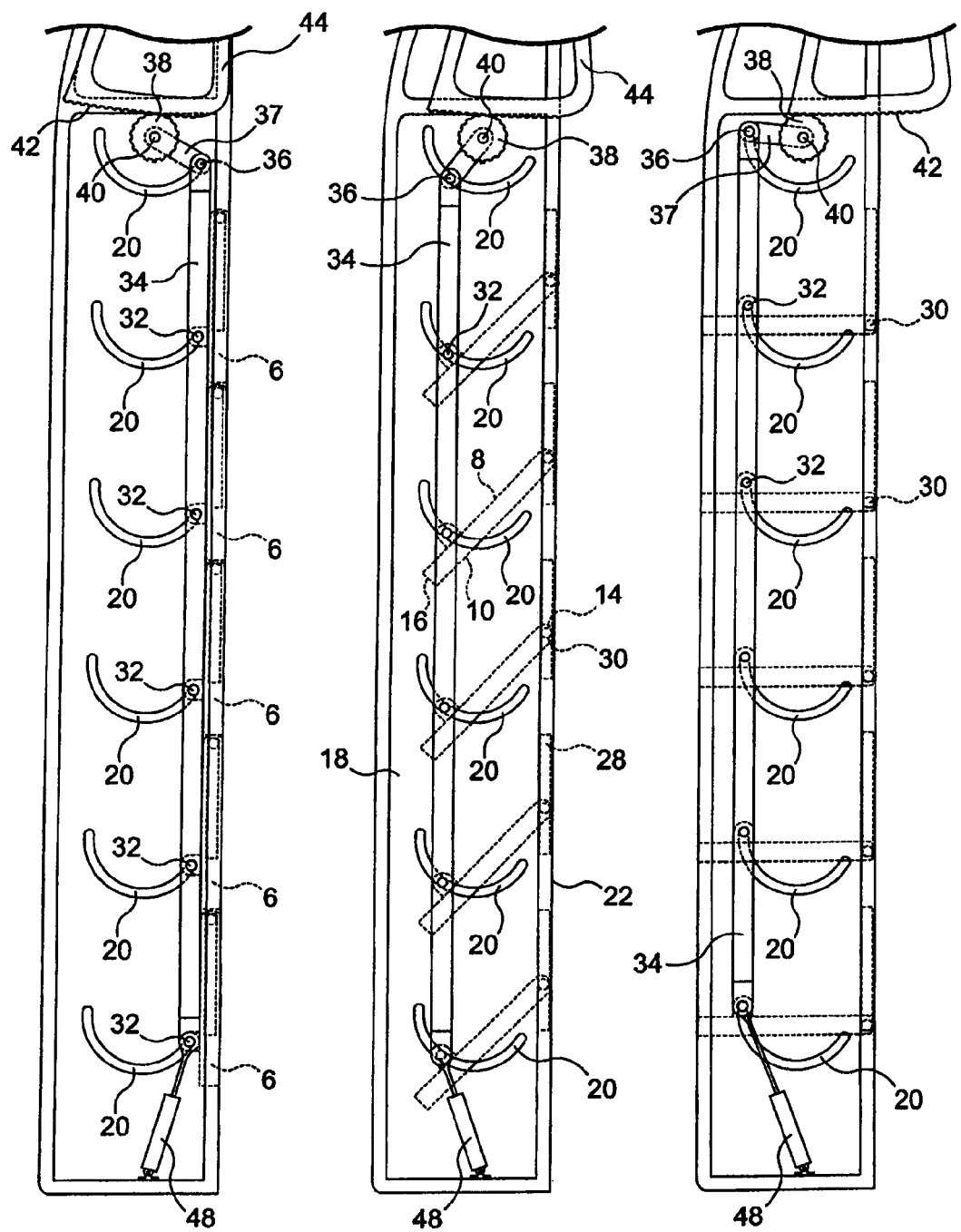

COLLAPSIBLE STAIRCASE, NOTABLY FOR A VEHICLE SUCH AS AN AIRCRAFT

BACKGROUND OF THE INVENTION

I. Field of the Invention

The present invention relates to a collapsible staircase, notably for a vehicle such as an aircraft.

II. Description of Related Art

In vehicles, and in particular aircraft, it is advisable to save space. This is a constant concern of the person skilled in the art. The saved space makes it possible to increase the comfort of the passengers and/or to decrease the overall dimensions, so that the size and thus also the weight of the vehicle structure can be reduced. If more space is offered to the passengers, the company operating this vehicle achieves a commercial advantage. If the structure is smaller and/or lighter, the advantage is then manifested in operating costs.

A staircase is a convenient means making it possible to move from one level to another. It has the disadvantage of being cumbersome. Documents FR 2873349 or US 2006/113427 show, for example, a use of a staircase in an aircraft. To limit the space requirement, a traditional solution is to replace a staircase by a ladder, as suggested in the aforesaid documents. This can be moved around more easily. There also exist collapsible staircases that can be stored in a ceiling, for example by pivoting. To limit the space requirement, it is also known to make staircases steeper, or in other words with a greater inclination than a traditional staircase.

The present invention then has the objective of providing a staircase intended more particularly for a vehicle, that will not encroach either on an aisle or the like intended for the passage of passengers into the vehicle or on the storage volume usually available in the said vehicle.

BRIEF SUMMARY OF THE INVENTION

To this end it proposes a collapsible staircase notably for a vehicle, provided with a set of flat parts each intended to function as steps.

According to the present invention, each flat part can be moved between a first position and a second position; all the flat parts are substantially coplanar when they are in their first position, and the flat parts are disposed one above the other and at a distance from one another when they are all in their second position.

The staircase created in this way is a combination of a staircase and a ladder. To its users it offers the comfort of a staircase having steps that can be broad to provide good support, and the reduced space requirement of a ladder, especially because of the fact that it is very steep, since it has an inclination of 90°.

According to a preferred embodiment, a staircase according to the invention is provided with two vertical beams, between which there are mounted the flat parts intended to function as steps. These beams then serve as guides for the steps during their movement, and the fact that the steps are held at both ends permits them to be firm and to support the weight of a person easily.

The flat parts of the staircase can be simply pivotable in order to change from their first position to their second position. However, a preferred embodiment provides that the movement of each flat part between its first position and its second position is a combination of a translation and a rotation. In this case, each flat part is guided, for example, on the one hand by a pin or similar element sliding in a straight corresponding slot disposed substantially in the plane of the flat parts when they are in their first position and on the other hand by a pin or similar element sliding in a curved corresponding slot having a shape resembling an arc of a circle.

To facilitate the use of the staircase, all the flat parts are connected to one another by a connecting rod. In this way, the movement of one step or flat part of the staircase pulls the other steps along in its movement.

For greater comfort of the users and greater ease of use, a staircase according to the invention is advantageously provided in addition with at least one holding handle to assist a user in climbing the staircase, and this handle can be moved between a retracted position inside a wall and a service position in which it is accessible to the user. Of course, it is preferable to have two holding handles, one for each side of the staircase. The said holding handle is preferably connected to a mechanism that acts on the flat parts to make them move from their first position into their second position and vice versa in such a way that, when the flat parts move from their first position into their second position, then the said handle moves from its retracted position to its service position, and vice versa.

In the case in which the staircase is provided both with a connecting rod between the flat parts and with a handle, then the said handle pivots advantageously so as to move from its service position to its retracted position and vice versa, and the connecting rod connecting the flat parts advantageously drives a toothed wheel in rotation during the movement of the flat parts, this toothed wheel then driving the holding handle. In the same movement, all the flat parts intended to function as steps and the holding handle(s) then move from their service position to their idle position.

The present invention also relates to a rest compartment for at least one member of the aircraft crew and/or to an aircraft, characterized in that they are provided with an access staircase such as described hereinabove.

BRIEF DESCRIPTION OF THE DRAWINGS

Details and advantages of the present invention will become more apparent from the description hereinafter, given with reference to the attached schematic drawings, wherein:

FIG. 2 illustrates the staircase of FIG. 1 in its collapsed position, FIG. 3 illustrates the staircase of the preceding figures in an intermediate position, FIG. 4 illustrates the staircase of the preceding figures in the service position illustrated in FIG. 1, FIGS. 5 to 7 are larger-scale side views of the staircase of FIGS. 1 to 4 in three different positions.

DETAILED DESCRIPTION OF THE INVENTION

Figure 1:
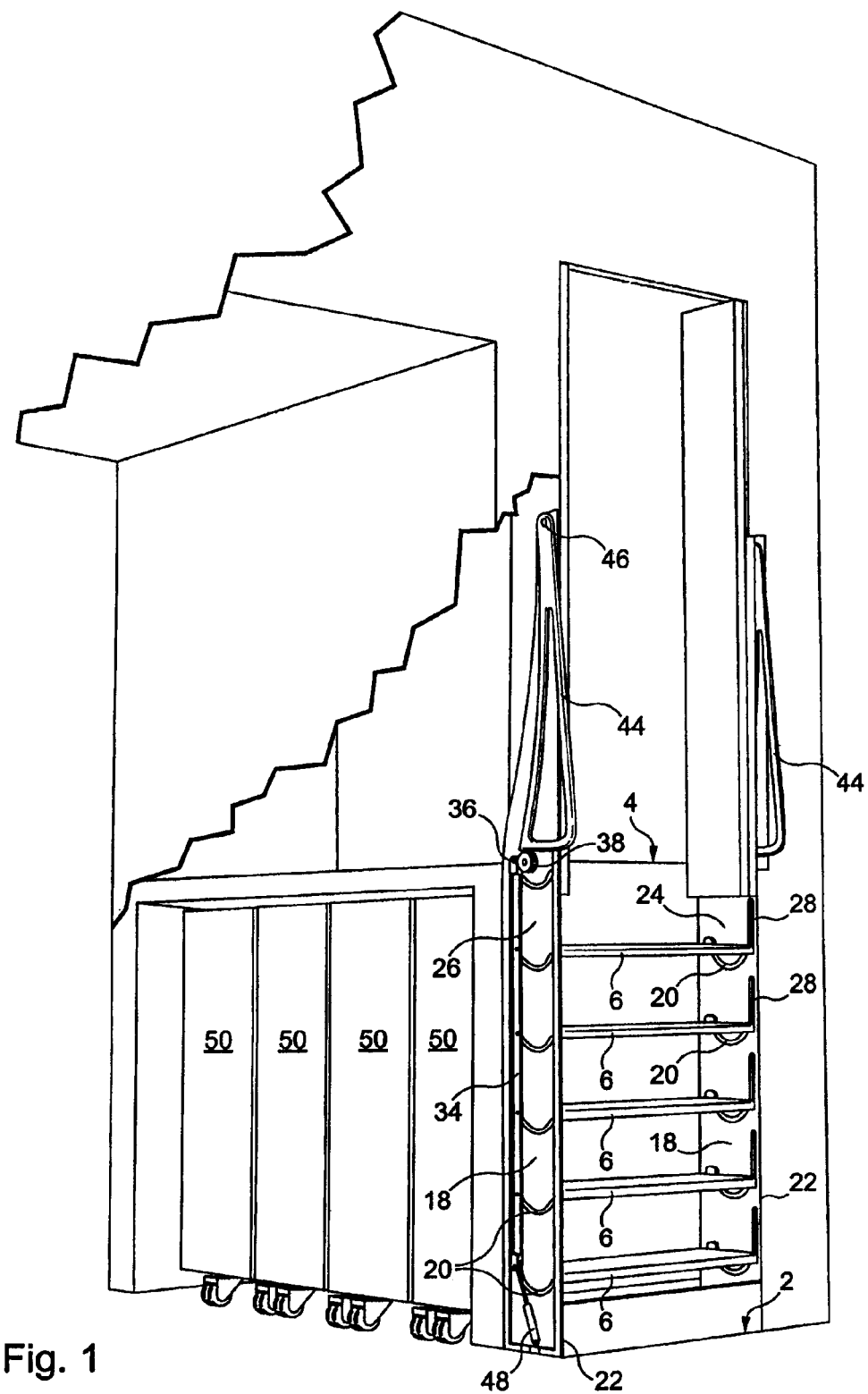
FIG. 1 illustrates the entrance of a rest compartment for the pilot of an aircraft equipped with a staircase according to the invention.

The attached drawings illustrate a preferred embodiment of a staircase according to the invention. In this illustrated embodiment, the staircase makes it possible to move from a first level 2 to a landing 4. In the description hereinafter, it is assumed that landing 4 is horizontal and that first level 2 corresponds to an aisle that, for example, also has a horizontal floor.

The staircase illustrated in the drawings is provided with five steps 6, which make it easier to move from first level 2 to landing 4.

As is clearly apparent from the attached drawings, steps 6 are each movable steps. They can be moved between a first position (FIGS. 2 and 5) and a second position (FIGS. 1, 4 and 7). In the first position, the staircase cannot be used. Steps 6 are all oriented vertically and thus form a vertical wall. In turn, the second position of steps 6 permits use of the staircase.

Each step 6 has an overall rectangular shape. It is made, for example, from sheet metal, such as aluminum sheet, or from a composite material. Each step 6 has an upper face 8, a lower face 10, two side edges 12, a front edge 14 and a rear edge 16.

The upper face of step 6 corresponds to the face intended to receive the foot of a user when the staircase is in its use position of FIGS. 4 and 7. Lower face 10 of each step corresponds to the face opposite upper face 8. Side edges 12 correspond to the short sides of rectangular step 6. Front edge 14 corresponds to what is usually known as the "step tread" in a staircase. It is the step edge facing the user as he is climbing the staircase. Rear edge 16 is the edge opposite front edge 14.

In the collapsed position of the staircase, or in other words when the staircase is not in service, steps 6 are disposed in a vertical plane, one above the other. For two neighboring steps 6, therefore, rear edge 16 of one is in contact (or almost so) with front edge 14 of neighboring step 6. In this way the five steps 6 form a vertical flat panel. It is noted that lower face 10 of each step is visible here. It is then possible to provide a design on this lower face 10. When the staircase is in use, the esthetic appearance of lower face 10 is not affected by the numerous movements of users, since nothing is acting on this lower face 10.

In the service position of the staircase, each step 10 is disposed horizontally. The steps are disposed one above the other and of course are spaced apart, but without horizontal offset from one to the other. Thus all the front edges are in the same vertical plane.

As can be seen in the drawings, steps 6 are mounted between two vertical beams 18. These vertical beams 18 can correspond to an already existing structure having a shape adapted for accommodating the staircase described here. As an example, these beams can be made of an aluminum-base metal alloy. Each beam in turn also has a substantially rectangular shape. It is made, for example, from sheet metal having a width slightly greater than the depth of steps 6, and its length is slightly greater than the distance separating first level 2 from landing 4. By depth of steps 6 there is understood here the length of side edges 12. In turn, the width of steps 6 corresponds to the length of the front and rear edges of the steps.

Vertical beams 18 are disposed in a vertical plane perpendicular to steps 6, both when the latter are in their collapsed position of FIGS. 2 and 5 and when they are in their active position of FIGS. 4 and 7.

It is noted that slots 20 are present in the vertical beams. These slots have a shape of an arc of a circle.

By analogy with the orientation chosen for steps 6, the term front edge 22 of vertical beams 18 will be applied hereinafter to the edge of each of these beams that faces a user climbing the staircase. Front edge 22 of a vertical beam 18 therefore corresponds to a long side of the rectangular shape of the vertical beam. As is evident from the drawings, the two vertical beams 18 are parallel and separated from one another by a distance corresponding substantially to the width of steps 6. Hereinafter the term inside face 24 of a vertical beam 18 will be applied to the face of this beam that is oriented toward the other vertical beam. The other face of the vertical beam 18 under consideration is referred to as the outside face.

In the same way that a slot 20 of a vertical beam 18 corresponds to each step 6, a slideway 28 mounted on inside face 24 of vertical beam 18 at the level of front edge 22 of this beam is associated with each step 6. This slideway 28 has a straight slot that is closed at least at its lower end (meaning that oriented toward first level 2).

Figure 8:
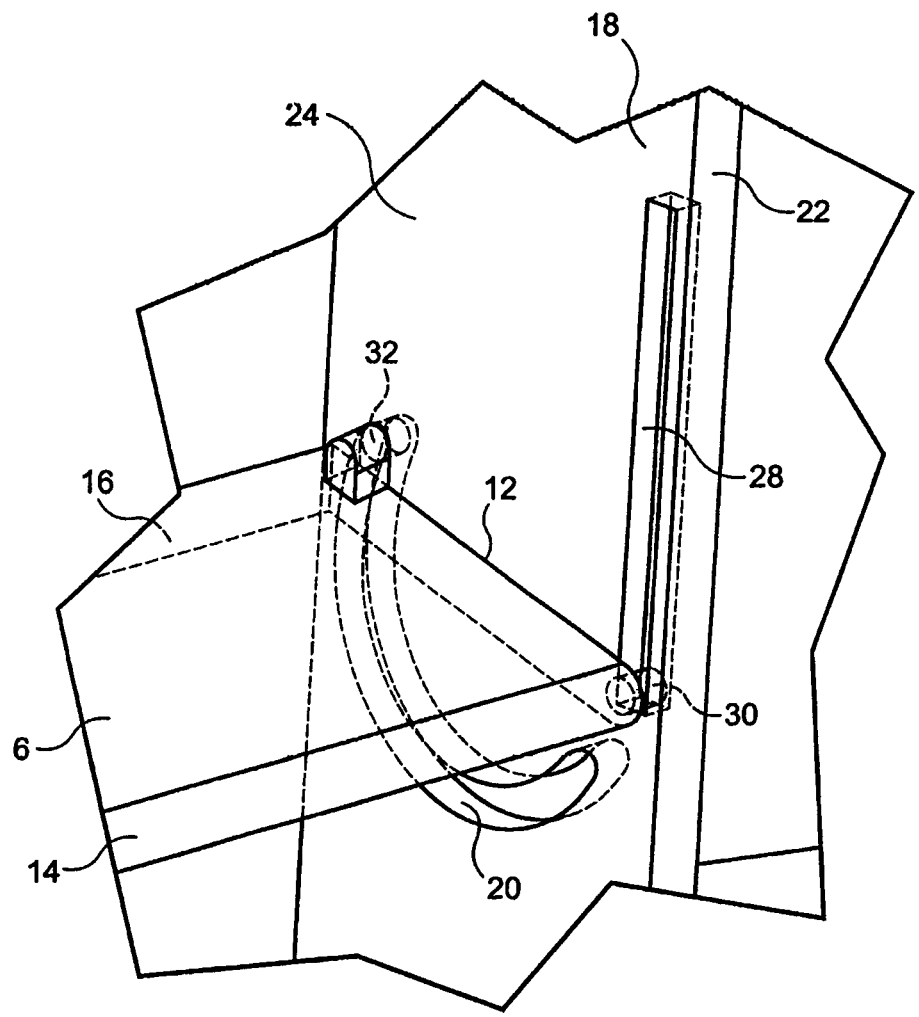
FIG. 8 shows in more detail the fixation of a step in the embodiment of the staircase illustrated in the preceding figures.

Each side edge 12 of a step 6 is provided with a first pin 30 intended to cooperate with a corresponding slideway 28 and with a second pin 32 intended to cooperate with a corresponding slot 20. First pin 30 is disposed on the corresponding side edge 12 in immediate proximity to front edge 14 of the corresponding step 6. Second pin 32 in turn is disposed at a distance from the first pin but is not necessarily located at the level of rear edge 16 of step 6. In the illustrated embodiment, this pin extends toward the outside of step 6 while being fixed on upper face 8 of this step 6 (see FIG. 8), and it is located closer to rear edge 18 than to front edge 16. The shape of slot 20 is defined in such a way that when first pin 30 slides in its slideway 28, second pin 32 corresponding to the same side edge 12 of step 6 slides freely in corresponding slot 20. The shape obtained is an arc of a circle, which should be positioned correctly as a function of the starting position and of the ending position of step 6. The length of slot 20—and of slideway 28—depends on the travel of step 6. When step 6 is in its service position, or in other words is horizontal, first pin 30 is stopped against the bottom of slide 28. Pins 30 and 32 and especially also slideway 28 must then be dimensioned to support the weight of a person with complete safety.

To permit all steps to be moved at the same time and in phase, a rod 34 is provided on each side of the staircase. Each rod 34 connects steps 6 at the level of their second pins 32. As can be noted, the figures show that each rod 34 is extended upward. The upper end of each rod 34 is equipped with a third pin 36. This slides in a slot 20 parallel to the other slots 20 of corresponding vertical beam 18. The cooperation of third pin 36 with corresponding slot 20 ensures guidance of the corresponding end of rod 34. It is also noted that the end of rod 34, equipped with third pin 36, is linked to an arm 37. The latter connects the end of the rod to a toothed wheel 38. This wheel is mounted around a spindle 40 that is fixed relative to the corresponding vertical beam 18. This toothed wheel 38 engages with a rack 42.

A holding handle 44 is integral with rack 42. The assembly formed by holding handle 44 and rack 42 is mounted pivoting around a second horizontal spindle 46 that in this case is disposed in the extension of the corresponding vertical beam 18. Rack 42 then has a shape of an arc of a circle whose center corresponds to second spindle 46.

With such a structure, the movement of steps 6 drives the movement of holding handles 44 and vice versa. Holding handles 44 are defined in such a way that they are retracted when the staircase is not in service and that they appear and can be grasped when the staircase is in service.

In the preferred embodiment illustrated in the drawings, the lower end of rod 34 is connected to a gas spring 48. It is possible to provide only a single gas spring 48 for a single rod 34, but preferably each rod 34 is equipped with its own gas spring 48. The gas spring(s) 48 used make(s) it possible to ensure assistance to the user at the time of moving of steps 6 from one position to another.

Conceivably the movement of steps 6 can be controlled manually or electrically. In the case of manual opening, it can be provided, for example, that holding handles 44 function as control handles for moving the staircase into service and out of service. The shape of these holding handles 44 is then designed such that they can function just as well from landing 4 as when the user is on first level 2. Electrical opening is achieved by providing, for example, a small electric motor that acts on toothed wheel 38.

The staircase described in the foregoing is illustrated in FIG. 1 in an application in which it permits access to a rest compartment for an aircraft pilot. It is noted that it is then integrated into a monument of the aircraft used in particular for storage of carts 50, usually known as "trolleys", and used to provide food and beverage services to the passengers during a flight. In this particular case, the staircase makes it possible to gain access from an aisle to a landing disposed above the carts without reducing the cart capacity of the monument. Here there are disposed four carts 50, as is usually the case for aircraft monuments. The staircase therefore does not limit the capacity of the monument and in addition it does not encroach on the neighboring aisle. Only holding handles 44 project into the aisle, but they can be retracted into the interior of the monument so that they no longer present an obstacle.

By virtue of its very small space requirement, this staircase can find other applications in an aircraft or else in other vehicles (train, bus, ship, etc.).

The staircase described with reference to the drawings also has the esthetic advantage of being able to be "invisible" when it is not in service. As indicated in the description, when the staircase is in its idle position, steps 6 form a flat panel that can easily be integrated into a wall. Vertical beams 18 can also be treated esthetically so that they are discreet or quasi-invisible in their environment.

A staircase such as described hereinabove is better adapted for permitting movement from a lower level to an upper level when the difference between the height of the two levels is not very great. Nevertheless, by providing adequate holding handles, staircases with a larger number of steps 6 can be designed in accordance with the present invention.

For ergonomic reasons, the depth of steps 6 is preferably on the order of 180 mm. This dimension makes it possible not only to have sufficient support for the foot of a person ascending or descending the staircase but also to have steps that are correctly spaced from one another in service position of the staircase.

The present invention is not limited to the preferred embodiment illustrated in the drawings and described in the foregoing. It also relates to all the alternative embodiments mentioned and those within the capacity of the person skilled in the art within the scope of the claims hereinafter.

The invention claimed is:

1. A collapsible staircase, comprising:
a set of flat parts,
each of the flat parts configured to function as a step;
two vertical beams, vertical in use, wherein the flat parts are mounted between the two vertical beams; and
at least one holding handle to assist a user in climbing the collapsible staircase, wherein the at least one handle is movable in a direction perpendicular to a major vertical longitudinal axis of at least one of the two vertical beams between a retracted position inside a wall and a service position in which the at least one holding handle is accessible to the user, wherein each of the flat parts is pivotable between a first collapsed position and a second non-collapsed position,
each of the flat parts has a major plane substantially coplanar with each other when in the first position,
the major planes of each of the flat parts are disposed parallel to and at a distance from each other when in the second position,
the flat parts include a major axis and a minor axis, the flat parts are configured to pivot about an axis which is parallel to the major axis,
the two vertical beams are fixed in a same position when the flat parts are in the first and the second positions,
each of the flat parts are configured to move from the first position to the second position with a combination of a translation and a rotation,
the at least one holding handle is pivotable between the service position and the retracted position,
a toothed wheel is configured to be driven by the at least one holding handle, and
a connecting rod connecting the flat parts to each other is configured to be driven by the toothed wheel in rotation during a movement of the flat parts between the first and second positions.

2. The collapsible staircase according to claim 1, wherein each of the two vertical beams includes:
a plurality of straight slots disposed substantially in the major plane of each of the flat parts when the flat parts are in the first position, and
a plurality of curved slots having a circular shape,
each of the flat parts includes:
a first pin, and
a second pin, and
each of the flat parts is rotatable by the first pin of each of the flat parts slidable in a respective straight slot of the plurality of straight slots while the second pin of each of the flat parts is slidable in a respective curved slot of the plurality of curved slots.

3. The collapsible staircase according to claim 1, wherein the at least one holding handle is connected to a mechanism that allows the flat parts to move between the first position in which the holding handle is in the retracted position and the second position in which the holding handle is in the service position.

4. A rest compartment for at least one member of an aircraft crew, the rest compartment comprising the collapsible staircase according to claim 1.

5. The collapsible staircase according to claim 1, wherein the flat parts are in a substantially vertical plane when in the first position and in a substantially horizontal plane when in the second position.

6. The collapsible staircase according to claim 1, wherein the two vertical beams have a rectangular shape.

7. The collapsible staircase according to claim 1, wherein a width of the vertical beams is substantially equal to a depth of the flat parts when in the second position in order for the vertical beams and the flat parts to project at a substantially equal distance from a wall.

8. The collapsible staircase according to claim 1, wherein a front edge and a back edge of the flat parts are parallel to the major axis.

9. The collapsible staircase according to claim 1, wherein when in the first position, a plane of a major surface of one of the flat parts is parallel to a direction in which the vertical beams extend.

10. The collapsible staircase according to claim 9, wherein when in the second position, the plane of the major surface of the one of the flat parts is perpendicular to a direction in which the vertical beams extend.

11. The collapsible staircase according to claim 1, wherein when in the second position, a plane of a major surface of one of the flat parts is perpendicular to a direction in which the vertical beams extend.

12. An aircraft, comprising:
a floor;

a landing above the floor;

a collapsible staircase disposed to provide access between the floor and the landing, the collapsible staircase comprising:

a set of flat parts, each of the flat parts configured to function as a step;

two vertical beams fixed to the floor at a specific position, wherein the flat parts are mounted between the two vertical beams; and at least one holding handle to assist a user in climbing the collapsible staircase, wherein the at least one holding handle is movable in a direction perpendicular to a major vertical longitudinal axis of at least one of the two vertical beams between a retracted position inside a wall and a service position in which the at least one holding handle is accessible to the user, wherein each of the flat parts is pivotable between a first collapsed position and a second non-collapsed position, each of the flat parts has a major plane substantially coplanar with each other when in the first position, the major planes of each of the flat parts are disposed parallel to and at a distance from each other when in the second position, the two vertical beams are fixed at the specific position when the flat parts are in the first and the second positions, each of the flat parts are configured to move from the first position to the second position with a combination of a translation and a rotation, the at least one holding handle is pivotable between the service position and the retracted position, a toothed wheel is configured to be driven by the at least one holding handle, and a connecting rod connecting the flat parts to each other is configured to be driven by the toothed wheel in rotation during a movement of the flat parts between the first and second positions.

13. The aircraft according to claim 12, further comprising a monument, wherein the collapsible staircase is integrated in the monument.

14. The aircraft according to claim 12, wherein the toothed wheel is driven by the at least one holding handle when moving between the retracted position and the service position.

15. The aircraft according to claim 12, wherein each of the two vertical beams includes:

a plurality of straight slots disposed substantially in the major plane of each of the flat parts when the flat parts are in the first position, and a plurality of curved slots having a circular shape, each of the flat parts includes:

a first pin, and a second pin, and each of the flat parts is rotatable via the first pin of each of the flat parts slidable in a respective straight slot of the plurality of straight slots while the second pin of each of the flat is slidable in a respective curved slot of the plurality of curved slots.

16. The aircraft according to claim 12, wherein the two vertical beams are perpendicular to the floor.

17. The aircraft according to claim 12, wherein when in the first position, a plane of a major surface of one of the flat parts is parallel to a direction in which the vertical beams extend, and when in the second position, the plane of the major surface of the one of the flat parts is perpendicular to a direction in which the vertical beams extend.

* * * * *